UNITED STATES PATENT OFFICE.

TORGNY ALBIN EKLUND, OF STOCKHOLM, AND CARL GÖSTA LÖFVEBERG, OF VISBY, SWEDEN.

INSULATING AND BUILDING MATERIAL AND METHOD OF PRODUCING SAME.

1,392,127. Specification of Letters Patent. Patented Sept. 27, 1921.

No Drawing. Application filed March 11, 1920. Serial No. 365,053.

*To all whom it may concern:*

Be it known that we, TORGNY ALBIN EKLUND and CARL GÖSTA LÖFVEBERG, subjects of the King of Sweden, and residents, respectively, of Stockholm, in the Kingdom of Sweden, and of Visby, in the Kingdom of Sweden, have invented a new and useful Improvement in Insulating and Building Materials and Methods of Producing Same, of which the following is a specification.

Fresh water marl (Swedish "bleke," German "wiesenkalk" or "seekreide") is a natural product which is found for instance in peat-moors and is believed to be formed by precipitation from calciferous waters. It is a loose substance which substantially contains calcium compounds, from 90 to 98 per cent. calcium carbonate. In the following specification the said substance is referred to as "marl."

The present invention relates to a method of producing of such marl a mass or material for insulating heating and refrigerating plants and installations, and from which mass various building materials may be produced, such as bricks, slabs, boards, and the like.

The invention is based on the discovery that such marl is a very poor conductor of heat, and that articles formed of such marl are insulators to heat and sound to a very high degree, and simultaneously, such marl is very capable of being molded and also possesses a comparatively great natural adhesive or binding power. The said natural binding power of the marl, however, is not sufficiently great to render possible any extended use in practice of marl in unmixed state as an insulating or building material. For obtaining a material which shall be useful in practice it is necessary to add a binding material to the marl.

We have found that it is only necessary to add to the marl a very small percentage of cellulose, and that such addition of cellulose when intimately mixed with the marl produces very favorable results.

The method according to the present invention is thus characterized by this that the marl is intimately mixed with a suitable quantity of cellulosic fiber, for instance paper pulp, waste paper, peat or other vegetable fiber, kelp, straw, hemp, flax, wood pulp, or the like. The percentage of cellulosic fiber added may vary according to the various purposes for which the material is to be used. Practical tests have proved, however, that an addition of only 3 to 5 per cent. by weight of cellulosic fiber is sufficient for obtaining a perfectly satisfactory reinforcement of the marl. It has also been proved by tests that the purer the cellulose the better will it reinforce the marl, so that it is preferred to use cellulosic fiber freed from incrustating substances.

The method may be carried out, for instance, in the following manner:

3 to 5 per cent. by weight of fibered waste paper is worked by means of a mixing machine into 97 to 95 per cent. by weight of moist marl. The mass produced by the mixing may be used in many various ways. It may for instance be used in its original wet state for making various kinds of insulations, or for building or casting walls and other structures. The mass may also be dried and ground, and may afterward be used in the same manner as the wet mass after adding water to the same. One of the most profitable uses is to mold or press articles of the mass which are then dried and afterward used for building or insulating purposes.

Owing to marl being a poor conductor of heat, and to the high porosity obtained, the products manufactured in the manner described possess the advantage of being particularly well suited for all kinds of insulating purposes. Articles produced from the mass as well as insulations made from the same, possess, notwithstanding the high porosity which may vary up to 60 per cent. and more, a very great strength. Simultaneously, they are elastic and capable of bending, and are tough, and in certain respects the material may be treated as wood. For instance, it may be sawed, planed, and otherwise treated with different kinds of cutting tools practically as easily as wood. Owing to the great binding power nails may be driven into the articles, even close to the outer edges of the same, without cracking the articles, and the nails will hold practically as securely as in wood. The material being also very fire-proof and particularly insensitive to changes of temperature and to atmospheric influences, and necessitating only very simple and inexpensive methods for its production, the material is exceedingly well suited for various kinds of building applications. A further very important advantage is that the material has a very low specific gravity.

The production of articles of different dimensions is preferably made in ordinary brick presses, but the mass may also be molded, rolled, or the like, after which the articles are dried. The bricks or the like produced may be used directly, or various dimensions and thicknesses may be sawed from the same.

In some cases it may be advantageous to add to the marl, in addition to the cellulosic fiber, also a substance, such as cement, or lime, plaster, water-glass, or the like. By such addition the material obtains an increased resistance to moisture which will be of importance in certain cases. An additional advantage is that by the addition of such a substance the articles become less apt to shrink during the drying, with the result that their specific gravity will be slightly lower.

We claim:—

1. The process of producing an insulating and building material which consists in mixing marl with cellulosic fiber.

2. An insulating and building material consisting of a mixture of marl and cellulosic fiber.

TORGNY ALBIN EKLUND.
CARL GÖSTA LÖFVEBERG.